May 13, 1969 F. L. BURKETT 3,444,282
METHOD FOR FORMING CRIMPED RIM ON A FOAM PLASTIC OBJECT
Filed March 28, 1966
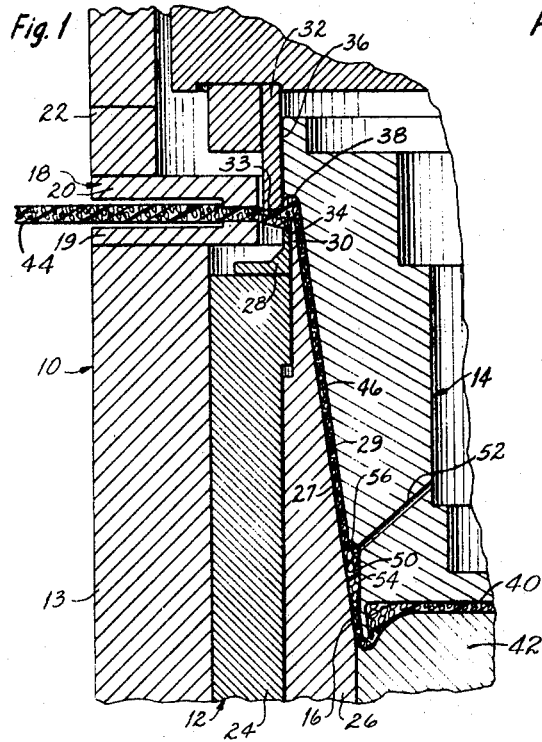
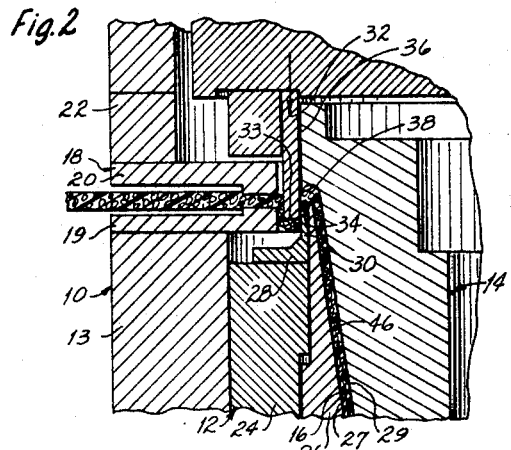
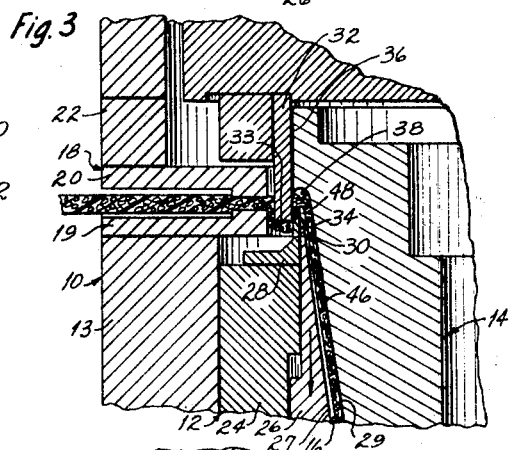
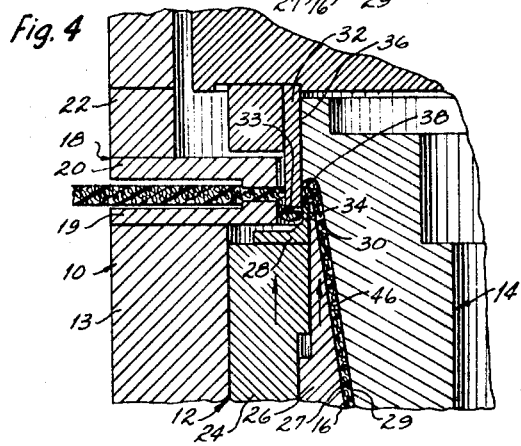
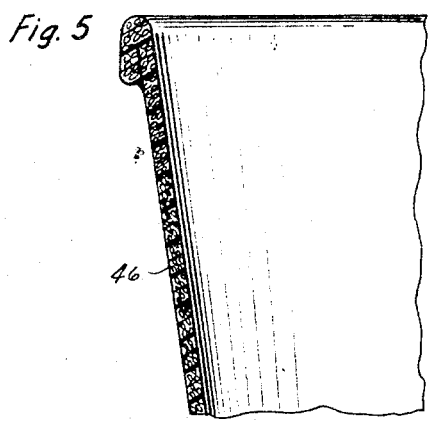
INVENTOR.
Francis L. Burkett
BY Dominik & Stein
ATTORNEYS 3,444,282
METHOD FOR FORMING CRIMPED RIM ON A FOAM PLASTIC OBJECT
Francis L. Burkett, Breckenridge, Mich., assignor to The Dow Chemical Company, Midland, Mich., a corporation of Delaware
Filed Mar. 28, 1966, Ser. No. 537,738
Int. Cl. B29d *27/00*
U.S. Cl. 264—48                               3 Claims This invention relates to a method for foaming foam plastic and more particularly to a method for forming a crimped edge on and a spacer in a drinking cup or the like of foam plastic.

Drinking cups of foam plastic have become quite popular because of their ability to insulate against loss of heat or cold of the contents and against transmission of heat to the touch of the user of the cup. Foam plastic cups, particularly those of foam polystyrene, are also very attractive in appearance. While it has been suggested that sheets of foam plastic may be used with a vacuum forming process to form cups (see U.S. 3,128,029), the resultant product is not completely satisfactory. The upper edge of the drinking cup has an undesirable sharp edge and is subject to rim breaking. So, the trade has generally utilized a molding operation for the manufacture of cups of foam plastic.

Since drinking cups mostly are used in automatic dispensing machines, they must be stacked or nested to economize on space, but the cups must be easily separated. Unfortunately, foam plastic cups have a tendency to "hang up" and this has prevented their wholesale use by the vending machine industry.

An object of the present invention is to provide an improved method for forming foam plastic cups.

Another object is to provide an improved method for forming foam plastic cups with an edge or rim of desirable configuration and with spacers for enabling stacking or nesting of the cups without "hang up."

Another object is to provide a method for forming the edge or rim by crimping to provide improved strength.

Still another object is to provide a method for shaping a container from foam plastic sheet and simultaneously forming a crimped edge or rim on the container. It is further contemplated that the container also be sheared from the sheet in a single operation.

Still another object is to provide a method for forming indents above the base of the drinking cup, to provide spacers for stacking or nesting them. It is contemplated that the indents be formed by selectively super-expanding areas of the drinking cups.

Other objects of the invention will in part be obvious and will in part appear hereinafter.

The above objectives are accomplished with apparatus which generally comprises a mold having an outer wall, an inner wall and a support between the outer and inner walls and upon which is affixed a compression finger. A die having a shearing ring is provided, and the shearing ring is movable to a cooperative relationship with the compression finger to fold the upper edge of a cup being formed and to cut from a sheet of foam plastic. During the cutting operation, the edge of the cup is also trimmed. The support and the inner wall are movable with respect to one another in a fashion such that the folded edge of the cup being formed is crimped against the side walls of the main body of the cup.

The die can also have a plug affixed to it which has at least one cavity formed therein in an area or areas that is to be selectively super-expanded. Each cavity has at least one vacuum port in it, for applying a vacuum to selectively expand the area defined by the cavity.

The method of the invention, which may advantageously be followed by use of the contemplated apparatus, permits foam plastic sheet, particularly polystyrene, to be formed such as by vacuum forming or match molding with a crimped edge or rim. The major portion of the desired object is first formed, and then the edge of the object is bent or folded downwardly about the periphery of the major portion and sheared from the sheet of material. After being folded and sheared, the peripheral edge is crimped against the side walls of the major portion of the object to provide a rim about the periphery thereof. Also, during the forming of the major portion of the object, a vacuum can be applied to super-expand selective areas about the base of the object to form indents therein, which indents can function to provide spacers for stacking or nesting the objects.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which:

FIG. 1 is a fragmented, cross-section of apparatus exemplary of the invention, illustrating the manner in which the foam plastic sheet is clamped in the apparatus, prior to its being formed and sheared, and also illustrating the manner in which an indent is formed in the sidewall of the object adjacent its base.

FIG. 2 is a similar view illustrating the manner in which the edge of the object is folded about the periphery of its main body and is sheared from the sheet.

FIG. 3 is a view illustrating the inner wall of the mold in its retracted position.

FIG. 4 is a view illustrating the manner in which the edge about the periphery of the main body of the object is crimped to form a rim.

FIG. 5 is a partial, cross-sectional view of the object illustrating the rim formed about its periphery.

Referring now to the drawing wherein a fragment of the apparatus 10 of the invention is illustrated in cross-section, it can be seen that the apparatus includes a mold 12 and a die 14. The die 14 can be a mating die or combination die and plug which when extended into the mold defines a cavity 16, as illustrated, or alternatively, the die can be simply a shallow plug or insert of sufficient length to extend into the mold 12 a short distance beyond its open end. The illustrated type of die is advantageously used to provide indents in the main body of the object, as explained more fully below. In the illustrated embodiment, the apparatus is adapted to form drinking cups; however, it will be apparent that other objects can be formed.

At the upper end of an outer wall 13 of the mold 12 is one-half of a clamping ring 18 comprising ring halves 19 and 20, the ends of which extend into the mold adjacent the die and are formed so as to clamp a sheet of foam plastic in close proximity to the outer top edge of the cavity 16. The ring half 20 is affixed to a ring 22 which is adapted to be reciprocally operated between a raised and a clamped (as illustrated) position.

Within the outer wall 13 of the mold 12 is a cylindrical-shaped support 24. An annular compression finger 28 which is substantially L-shaped is affixed to the upper end of the support 24. Interiorly of the support 24 is a concentrically positioned mold wall 26 which has a tapered interior surface 27 and which together with the exterior wall 29 of the die 14 form the cavity 16. The support 24 and the mold wall 26 are both adapted to be reciprocally operated with respect to one another and to the outer wall 13 by means not shown. The tapered upper end of the mold wall 26 is normally positioned to extend a short distance above the end of a leg 30 of the compression finger 28, as shown in FIG. 1.

The die 14 has a shear ring 32 which is positionally aligned so that upon being moved downwardly its lower edge 33 along with the upper edge 34 of the leg 30 of the compression finger 28 form a shear edge for cutting and trimming the sheet of foam plastic. The diameter of the upper end 36 of the die corresponds to the outer diameter of the leg 30 of the compresison finger 28. An edge forming groove 38 extends annularly about the die 14 and is positionally aligned with the upper end of the mold wall 26. The tapered wall 29 of the die joins with the one edge of the groove 38 and is extended by the groove 38 to the outer surface 36 of the die in a smooth fashion so as to provide a substantially rounded upper edge on a cup. The lower end 40 of the die 14 and the top surface 42 of the mold 12 can be correspondingly formed to provide a flat bottom on a cup, as shown, or a recessed bottom or any other desired configuration.

In practice of the invention, a sheet of foam plastic 44 is supported above the periphery of the mold 12. The sheet 44 is heated, in this position or prior to being moved to this position, until it may be readily deformed by the application of vacuum or by a match mold technique. The ring 22 of the mold is moved downwardly to clamp the sheet 44 between the ring halves 19 and 20 of the clamping ring 18. A vacuum is applied to passageways (not shown) in the mold 12 and the die 14 is moved into the mold, to form the main body of a cup 46, all as illustrated in FIG. 1. Alternatively, a match mold technique in place of the vacuum form technique, just described, can be used.

In FIG. 2, it can be seen that when the die 14 is fully extended into the mold 12, the shearing ring 32 is moved downwardly and first folds the sheet 44 over the upper end of the mold wall 26. As the shearing ring continues to move downwardly about the leg 30 of the compression finger 28, the cup is cut from the sheet of foam plastic and the edge of the cup is thereby trimmed.

In FIG. 3, after the cup is cut and trimmed, the mold wall 26 is moved downwardly so that its upper edge 34 is at the same or substantially the same height as the upper edge of leg 30 of the compression finger 28. It may be noted that a small slot 48 corresponding to the shape of the upper edge of the mold wall 26 is thereby provided between the folded top edge of the cup and its side walls.

In FIG. 4, the support 24 and hence the compression finger 28, and the mold wall 26 are simultaneously or else sequentially moved upwardly. The ends of the leg 30 of the compression finger and the mold wall 26 engage the edge of the folded top edge of the cup and in forcing the edge upwardly, crimps it against the side walls of the main body of the cup.

The formed cup 46 is cooled. The die 14 is then withdrawn from the mold 10 and the cup 46 readily removed by means of gas, or other fluid pressure applied to the inside of the mold, or by mechanical means.

In FIG. 5, the resulting cup rim is illustrated and it can be seen that the slot 48 may be closed and the trimmed edge is effectively crimped against the side walls of the main body of the cup. It may or may not be sealed against the side walls depending on the time and temperature utilized. The lower edge of the rim is also burnished so as to substantially eliminate sharp edges. It is found that this method of forming the rim on an object provides improved rim ductility, strength and appearance. Because of the improved ductility, rim snapping when a cup is squeezed is substantially reduced so that this objectionable feature of cups or other objects fabricated by other methods is virtually overcome. Sharp edges on the rim are also substantially eliminated so that this prior objectionable feature is no longer existent.

Referring again to FIG. 1, the die 14 has at least one and preferably two or more recessed cavities 50 formed in spaced relation about its periphery at its base. A vacuum port 52 is provided for each cavity 50, for applying vacuum to the cavity to super-expand selective areas of the main body of the object to provide indents 54. It can be seen that the indents 54 are substantially wedge-shaped, and the upper surfaces 56 thereof effectively form a ledge or shelf about the interior periphery of the main body of the object, in this case, a drinking cup. The indents 54 form spacers whereby a number of the cups can be stacked or nested, and individual ones of them can be easily removed from the stack.

Substantially any type of foam plastic can be used in practicing the invention. Examples of such plastics include, among others, polypropylene, polyurethane, cellulose acetate, the phenolics, the urea formaldehydes, polystyrene, styrene acrylonitrile copolymer, the silicones, polyvinyl chloride, polyethylene and the epoxies.

What is claimed is:

1. A method for forming a crimped rim on an object formed from a sheet of foam plastic comprising the steps of heating the sheet of foam plastic, forming the major portion of the desired object; folding downwardly the portion of said sheet extending about the periphery of the major portion of the object; shearing said sheet about the periphery of said major portion; and engaging and forcibly urging upwardly the lower exposed edge of the folded portion while confining the folded portion to crimp the folded portion against the side of said major portion of the object.

2. The method of claim 1 wherein the steps include folding downwardly over a longitudinally positionable mold wall which extends peripherally about the major portion of the object, a portion of said sheet extending over said mold wall; shearing said sheet about the periphery of said mold wall; withdrawing said mold wall from between the folded portion and the unfolded major portion; engaging and forcibly urging upwardly the lower exposed edge of the folded portion while confining the folded portion to crimp the folded portion against the side of said major portion of the object.

3. The method of claim 1 further including the steps of selectively super-expanding predetermined areas of said major portion of the object about its periphery adjacent its base by applying a vacuum to cavities defining said areas, to thereby provide indents in said major portions about its interior periphery.

References Cited

UNITED STATES PATENTS

| | | | |
|---|---|---|---|
| 3,137,747 | 6/1964 | Kline | 264—321 XR |
| 3,138,826 | 6/1964 | Jacobs et al. | |
| 3,173,174 | 3/1965 | Edwards | 264—294 XR |
| 3,338,997 | 8/1967 | Tigner | 264—296 XR |
| 3,357,053 | 12/1967 | Lyon et al. | 264—294 XR |

FOREIGN PATENTS

| | | |
|---|---|---|
| 1,337,903 | 8/1963 | France. |
| 1,175,108 | 11/1958 | France. |

PHILIP E. ANDERSON, Primary Examiner.

U.S. Cl. X.R.

18—5, 19; 264—92, 101, 321